United States Patent
Kim et al.

(10) Patent No.: US 12,452,799 B2
(45) Date of Patent: Oct. 21, 2025

(54) ELECTRONIC APPARATUS AND CONTROLLING METHOD THEREOF

(71) Applicant: SAMSUNG ELECTRONICS CO., LTD., Suwon-si (KR)

(72) Inventors: Jooyoo Kim, Suwon-si (KR); Hyungseon Song, Suwon-si (KR); Kyungjae Kim, Suwon-si (KR); Jongyoub Ryu, Suwon-si (KR); Dongjun Shin, Suwon-si (KR); Miyoung Yoo, Suwon-si (KR); Yoonhee Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 437 days.

(21) Appl. No.: 18/110,592

(22) Filed: Feb. 16, 2023

(65) Prior Publication Data
US 2023/0276374 A1    Aug. 31, 2023

Related U.S. Application Data

(63) Continuation of application No. PCT/KR2022/019396, filed on Dec. 1, 2022.

(30) Foreign Application Priority Data

Feb. 28, 2022    (KR) .................. 10-2022-0026357

(51) Int. Cl.
*H04W 52/34* (2009.01)
*H04W 52/02* (2009.01)

(52) U.S. Cl.
CPC ..... *H04W 52/346* (2013.01); *H04W 52/0212* (2013.01)

(58) Field of Classification Search
CPC ... H04W 52/34; H04W 52/346; H04W 52/02; H04W 52/0212; H04L 1/0026; H04L 1/0029
See application file for complete search history.

(56) References Cited

U.S. PATENT DOCUMENTS

| 8,849,097 B2 * | 9/2014 | Klappert ................ H04N 7/163 |
| | | 386/291 |
| 9,041,354 B2 | 5/2015 | Lee |

(Continued)

FOREIGN PATENT DOCUMENTS

| EP | 1898292 B1 | 11/2010 | |
| EP | 3978949 A2 * | 4/2022 | ........... G01S 13/003 |

(Continued)

OTHER PUBLICATIONS

International Search Report and Written Opinion (PCT/ISA/210, and PCT/ISA/237) dated Mar. 22, 2023, issued by International Searching Authority for International Application No. PCT/KR2022/019396.

*Primary Examiner* — Hai V Nguyen
(74) *Attorney, Agent, or Firm* — Sughrue Mion, PLLC

(57) ABSTRACT

A control method of an electronic apparatus may include receiving power usage from a plurality of terminal devices; classifying the plurality of terminal devices into a plurality of types, and generating power standardization distribution data by types of the classified terminal device; identifying a power standard score of each terminal device of the plurality of terminal devices based on the power usage of each of the plurality of devices included in a preset group and power standardization distribution data corresponding to each of the plurality of devices; identifying a priority of power control of each of the plurality of devices included in the preset group based on the identified power standard score; and identifying at least one device among a plurality of (Continued)

devices included in the preset group based on the identified priority and transmitting a control signal for power use to the identified device.

15 Claims, 8 Drawing Sheets

(56) References Cited

U.S. PATENT DOCUMENTS

| | | | |
|---|---|---|---|
| 9,116,014 B2 | 8/2015 | Oh et al. | |
| 10,491,001 B2 | 11/2019 | Lim et al. | |
| 10,664,931 B2 | 5/2020 | Watanabe et al. | |
| 10,763,682 B2 | 9/2020 | Kim et al. | |
| 12,036,948 B2* | 7/2024 | Mai | B60R 25/31 |
| 2008/0294922 A1* | 11/2008 | Hsieh | G06F 21/71 |
| | | | 713/324 |
| 2011/0148360 A1 | 6/2011 | Lee | |
| 2011/0150431 A1* | 6/2011 | Klappert | H04N 21/433 |
| | | | 386/277 |
| 2012/0020060 A1* | 1/2012 | Myer | F21S 9/043 |
| | | | 362/183 |
| 2014/0372781 A1* | 12/2014 | Klappert | H04N 21/47214 |
| | | | 713/323 |
| 2015/0234407 A1 | 8/2015 | Makino | |
| 2017/0018038 A1 | 1/2017 | Watanabe et al. | |
| 2020/0064960 A1* | 2/2020 | Munemoto | G06F 18/24 |
| 2020/0406860 A1* | 12/2020 | Mai | B60R 25/31 |
| 2022/0026519 A1* | 1/2022 | Wu | G01S 7/006 |
| 2022/0299619 A1* | 9/2022 | Hu | G01S 7/415 |
| 2022/0310251 A1* | 9/2022 | Phillips | G16H 40/67 |

FOREIGN PATENT DOCUMENTS

| | | | |
|---|---|---|---|
| JP | 2003162787 A | 6/2003 | |
| JP | 2008-253103 A | 10/2008 | |
| JP | 2012190457 A | 10/2012 | |
| JP | 5498517 B2 | 5/2014 | |
| JP | 6854270 B2 | 4/2021 | |
| KR | 101084216 B1 | 11/2011 | |
| KR | 101156533 B1 | 7/2012 | |
| KR | 10-2014-0057746 A | 5/2014 | |
| KR | 10-2016-0029414 A | 3/2016 | |
| KR | 101847177 B1 | 5/2018 | |
| KR | 10-2018-0137635 A | 12/2018 | |
| KR | 10-2021-0043389 A | 4/2021 | |
| KR | 102234703 B1 | 4/2021 | |
| KR | 1020210048848 A | 5/2021 | |
| KR | 10-2324103 B1 | 11/2021 | |
| KR | 10-2601189 B1 | 11/2023 | |
| WO | 2016195327 A1 | 12/2016 | |

* cited by examiner

ELECTRONIC APPARATUS AND CONTROLLING METHOD THEREOF

CROSS-REFERENCE TO RELATED APPLICATION(S)

This application is a bypass continuation application of International Application No. PCT/KR2022/019396, filed on Dec. 1, 2022, which claims priority to Korean Patent Application No. 10-2022-0026357, filed on Feb. 28, 2022, in the Korean Intellectual Property Office, the disclosure of which is incorporated by reference herein in its entirety.

BACKGROUND

Field

The disclosure relates to an electronic apparatus and a control method thereof, and more particularly, to an electronic apparatus for controlling power usage of an electronic apparatus in consideration of a use environment of a user and a control method thereof.

Description of Related Art

As electronic apparatuses are increasingly used, power consumption (e.g., energy usage) consumed in home is also increasing. Various methods capable of reducing the power usage of the electronic apparatus are underway since an increase rate of power usage is faster than an increase rate of the amount of power that may be supplied.

For example, electronic apparatuses that consume less power in terms of individual electronic apparatuses or have changed design specifications have been developed. In addition, various studies on a power control method in which an electronic apparatus can operate in a range of available power consumption in terms of system is being conducted.

In the related-art power control method, a mode is controlled to be switched to a normal operation, a low power mode operation, or a standby mode according to a priority. However, since the priority of the related-art power control method is determined according to a preset rule, there is a problem in that the related-art power control method may not reflect the use environment or power saving efficiency of each user.

Therefore, there is a necessity of a method of controlling power actively in consideration of use environment of a user or power saving efficiency, or the like.

SUMMARY

One or more embodiments may solve the above-described problems, and an object of the disclosure is to provide an electronic apparatus for controlling power of an electronic apparatus in consideration of power saving efficiency and a user's use environment, and a control method thereof.

In accordance with an aspect of the disclosure, a control method of an electronic apparatus according to an embodiment includes receiving power usage from a plurality of terminal devices; classifying the plurality of terminal devices into a plurality of types based on a preset criterion, and generating power standardization distribution data for each type among the plurality of types of the classified terminal device based on the received power usage; identifying a power standard score of each terminal device of the plurality of terminal devices based on the power usage of each terminal device of the plurality of terminal devices included in a preset group and the power standardization distribution data corresponding to each terminal device of the plurality of terminal devices; identifying a priority of power control of each terminal device of the plurality of terminal devices included in the preset group based on the identified power standard score; and identifying at least one terminal device among the plurality of terminal devices included in the preset group based on the identified priority, and transmitting a control signal for power use to the identified terminal device.

In accordance with an aspect of the disclosure, an electronic apparatus according to an embodiment includes a communication interface; and a processor configured to receive power usage from a plurality of terminal devices, classify the plurality of terminal devices into a plurality of types based on a preset criterion, generate power standardization distribution data by types of the classified terminal device based on the received power usage, identify a power standard score of each terminal device of the plurality of terminal devices based on the power usage of each terminal device of the plurality of terminal devices included in a preset group and the power standardization distribution data corresponding to each terminal device of the plurality of terminal devices, identify a priority of power control of each terminal device of the plurality of terminal devices included in the preset group based on the identified power standard score, identify at least one terminal device among a plurality of terminal devices included in the preset group based on the identified priority, and transmit a control signal for power use to the identified terminal device.

A non-transitory computer-readable storage medium in which a program for performing a control method of an electronic apparatus according to an embodiment of the disclosure is recorded includes receiving power usage from a plurality of terminal devices; classifying the plurality of terminal devices into a plurality of types based on a preset criterion, and generating power standardization distribution data for each type among the plurality of types of the classified terminal device based on the received power usage; identifying a power standard score of each terminal device of the plurality of terminal devices based on the power usage of each terminal device of the plurality of terminal devices included in a preset group and the power standardization distribution data corresponding to each terminal device of the plurality of terminal devices; identifying a priority of power control of each terminal device of the plurality of terminal devices included in the preset group based on the identified power standard score; and identifying at least one terminal device among the plurality of terminal devices included in the preset group based on the identified priority, and transmitting a control signal for power use to the identified terminal device.

DETAILED DESCRIPTION

Figure 1:
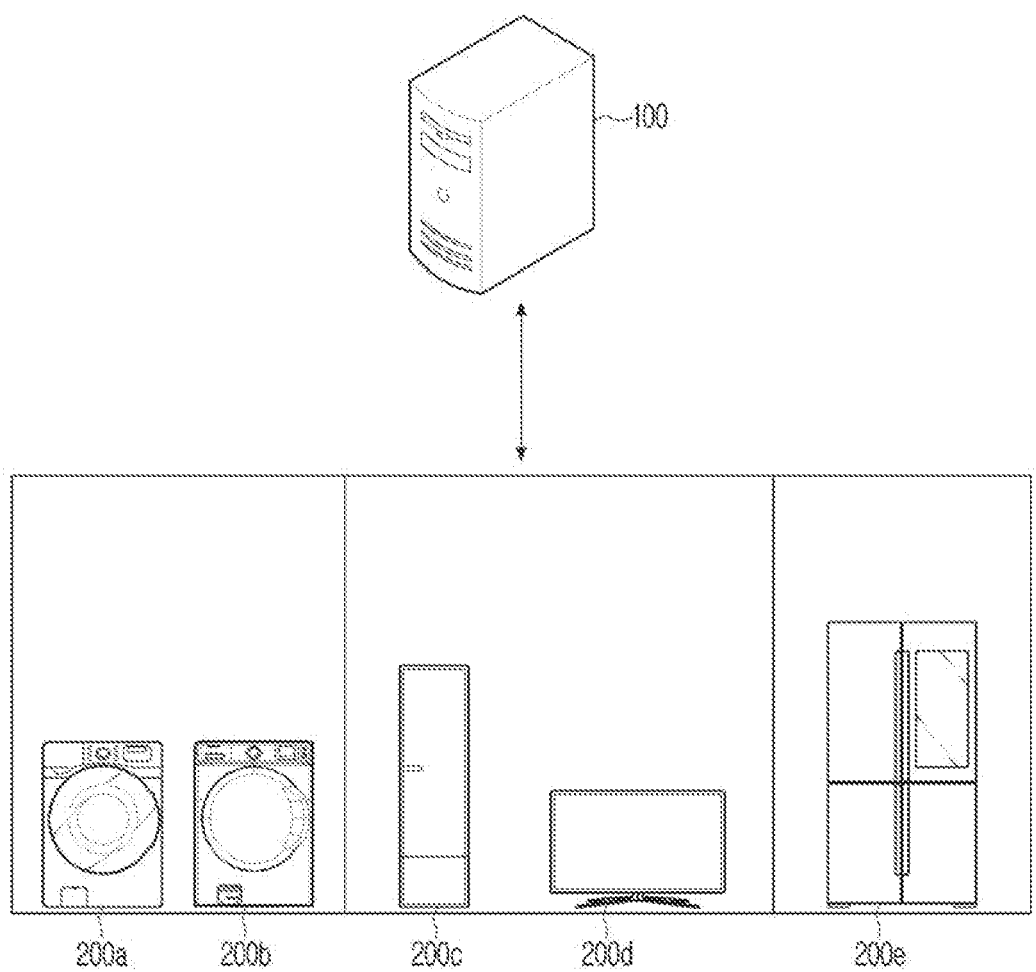
FIGS. 1 and 2 are diagrams illustrating a power control system according to an embodiment of the disclosure.

Hereinafter, various embodiments will be described in more detail with reference to the accompanying drawings. The embodiments described herein may be variously modified. Certain embodiments are depicted in the drawings and described in detail in the detailed description. However, the specific embodiments disclosed in the accompanying drawings are merely intended to easily understand various embodiments. Therefore, the technical idea of the disclosure is not limited by the specific embodiments disclosed in the accompanying drawings, and it should be understood that all equivalents or alternatives falling within the spirit and technical scope of the disclosure are included.

It will be understood that, although the terms first, second, etc. may be used herein to describe various elements, these elements should not be limited by these terms. The terms are used only for the purpose of distinguishing one component from other components.

It will be further understood that the terms "comprises" and/or "comprising," when used in this disclosure, specify the presence of stated features, integers, steps, operations, elements, and/or components, but do not preclude the presence or addition of one or more other features, integers, steps, operations, elements, components, and/or combinations thereof. It will be understood that when an element is referred to as being "connected" or "coupled" to another element, it may be directly connected or coupled to the other element or intervening elements may be present. On the other hand, when an element is referred to as being "directly connected" or "directly accessed" to another element, it should be understood that there are no intervening elements present.

Meanwhile, a "module" or a "unit" for an element used in the disclosure performs at least one function or operation. In addition, the "module" or "unit" may perform a function or an operation by hardware, software, or a combination of hardware and software. A plurality of "modules" or a plurality of "units" other than a "module" or a "unit" performed in a specific hardware or performed in at least one processor may be integrated into at least one module. As used herein, the singular forms are intended to include the plural forms as well, unless the context clearly indicates otherwise.

In the description of the disclosure, the order of each step should be understood nonrestrictively unless a preceding step must be performed before a subsequent step logically and temporally. That is, except for the exceptional case above, although a process described as a subsequent step is performed before a process described as a preceding step, it does not affect the essence of the disclosure and the scope of the disclosure should be defined regardless of order of steps. Also, description of "A or B" is defined to mean that both A and B are included, as well as selectively indicating any one of A and B. Also, the term "including" in this specification has a comprehensive meaning to further include another component in addition to elements enumerated to be included.

In this specification, only essential components necessary for the description of the disclosure are described and components not related to the essence of the disclosure are not mentioned. Also, only the mentioned components should not be construed to be included in an exclusive sense but should be construed in a non-exclusive sense to include any other component.

When it is decided that a detailed description for the known art related to the disclosure may unnecessarily obscure the gist of the disclosure, the detailed description may be shortened or omitted. While each embodiment may be implemented or operated independently, each embodiment may be implemented or operated in combination.

Figure 2:
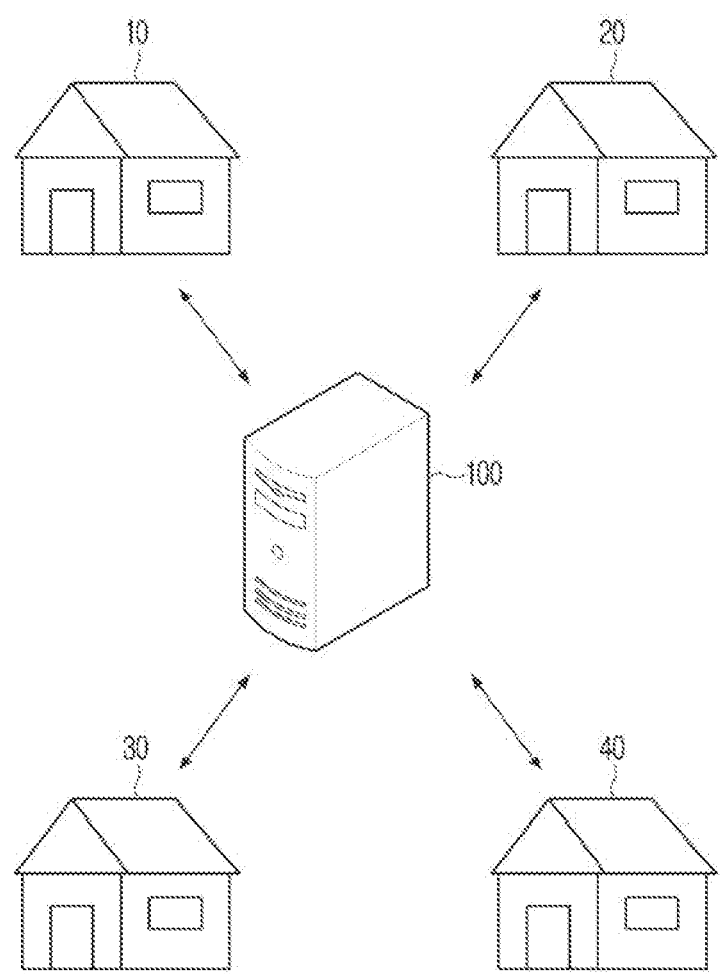

FIGS. 1 and 2 are diagrams illustrating a power control system according to an embodiment of the disclosure. FIGS. 1 and 2 will be described together.

Referring to FIG. 1, an electronic apparatus 100 and the plurality of terminal devices 200a, . . . , 200e disposed in a first home 10 are illustrated. For example, the electronic apparatus 100 may include a server, a cloud, and the like. The terminal devices 200a, . . . , 200e may include all terminal devices used by a general user including a terminal device called as a household device, such as an air conditioner, a dryer, a washing machine, an air dresser, a refrigerator, a TV, etc., disposed in a home, a terminal device such as a game machine, a set-top box, a desktop computer, and the like, an office terminal device such as a multi-functional device, a projector, or the like, disposed at a company, and a terminal device such as a smart phone, a tablet PC, a laptop computer, and the like.

The electronic apparatus 100 may receive information and power usage of the terminal device from each of the plurality of terminal devices disposed in the first home 10. For example, the information of the terminal device may include information such as a type of the terminal device (e.g., a washing machine, a refrigerator, a TV, etc.), a manufacturer, a model name, and the like. Meanwhile, a terminal device that is the same as or similar to a terminal device disposed in the first home 10 may be disposed on another home, and a different terminal device may be disposed. The electronic apparatus 100 may receive information and power usage of the terminal device from a plurality of terminal devices disposed in all homes.

FIG. 2 illustrates the electronic apparatus 100 receiving a type and power usage amount of a terminal device from a terminal device disposed in a plurality of homes. For example, as illustrated in FIG. 1, a dryer 200a, a washing machine 200b, an air dresser 200c, a TV 200d, and a refrigerator 200e may be disposed on the first home 10. The electronic apparatus 100 may receive information and power usage of the terminal device from each terminal device disposed in the first home 10. Similarly, the electronic apparatus 100 may receive information and power usage of the terminal device from each terminal device disposed in a second home 20, third home 30, and/or a fourth home 40. In an embodiment, although the first home 10 to the fourth assumption are illustrated in FIG. 2, the electronic apparatus 100 may receive information and power usage of the terminal device from a plurality of terminal devices disposed in a number of homes, companies, and buildings. In the disclosure, a single home, a company, and a building will be referred to as one group. For example, in FIG. 2, the first home 10 may be referred to as a first group, and the second home 20 may be referred to as a second group. That is, the group may be set based on a location at which the terminal device is disposed, a user, or the like.

The electronic apparatus 100 may receive information and power usage of the terminal device from each of the individual terminal devices. In an embodiment, the electronic apparatus 100 may receive information and power usage of the terminal device from each of the dryer 200a, the washing machine 200b, the air dresser 200c, the TV 200d, and the refrigerator 200e disposed in the first group.

Alternatively, the electronic apparatus 100 may receive information and power usage of individual terminal devices from a hub device (e.g., a master device). For example, a hub device may be disposed in each group. The hub device of each group may receive information and power usage of the terminal device from the individual electronic apparatuses in the group. The hub device may transmit the received information and power usage of the terminal device to the external electronic apparatus 100. According to an embodiment, in FIG. 1, the refrigerator 200e may operate as a hub device in the first group (first home). The refrigerator 200e may receive information and power usage of the terminal device from the dryer 200a, the washing machine 200b, the air dresser 200c, and the TV 200d in the same group. The refrigerator 200e may transmit the received information and power usage of each terminal device, information of the terminal device thereof, and power usage to the electronic apparatus 100.

The electronic apparatus 100 may classify the plurality of terminal devices into a plurality of types according to preset criteria. For example, the electronic apparatus 100 may classify the plurality of terminal devices to each individual device, such as the dryer 200a, the washing machine 200b, the air dresser 200c, the TV 200d, and the refrigerator 200e. Alternatively, the electronic apparatus 100 may classify the plurality of terminal devices into a more comprehensive concept, such as a washing-related product group, a display product group, and the like.

The electronic apparatus 100 may identify data of a power usage amount for each type of the classified terminal device and generate power standardization distribution data for each type of the terminal device. For example, the electronic apparatus 100 may identify received data of the power usage of the dryer 200a and generate power standardization distribution data of the dryer 200a. In the same manner, the electronic apparatus 100 may identify received data of a power usage amount of the refrigerator 200e and generate power standardization distribution data of the refrigerator 200e. When the electronic apparatus 100 classifies a plurality of electronic apparatuses as a comprehensive concept like a product group, the electronic apparatus 100 may identify data of the power usage of the dryer 200a and the washing machine 200b, and may generate power standardization distribution data of the dryer 200a and the washing machine 200b. The electronic apparatus 100 may classify the plurality of terminal devices into a plurality of types according to a preset criterion and generate power standardization distribution data for each type of the classified terminal device based on the received power usage.

The electronic apparatus 100 may identify the power standard score of each of the plurality of devices based on the power usage of each of the plurality of devices included in the preset group and the power standardization distribution data corresponding to each of the plurality of devices. The electronic apparatus 100 may identify a priority of power control of each of the plurality of devices included in the preset group based on the identified power standard score. For example, the electronic apparatus 100 may perform an entire process of training an artificial intelligence model and identifying a priority using the trained artificial intelligence model.

The functionality associated with artificial intelligence according to the disclosure operates via the processor and the memory. The processor may be configured with one or a plurality of processors. The one or more processors may include, for example, a general purpose processor, such as, for example, and without limitation, a central processing unit (CPU), an application processor (AP), a digital signal processor (DSP), or the like, a graphics-only processor such as a graphics processing unit (GPU), a vision processing unit (VPU), an artificial intelligence-only processor such as a neural processing unit (NPU), or the like. The one or more processors control the processing of the input data in accordance with a predefined operating rule or AI model stored in memory. Alternatively, if one or a plurality of processors is an AI-only processor, the AI-only processor may be designed with a hardware structure specialized for the processing of a particular AI model.

The pre-defined operating rule or AI model is made through learning. The basic AI model may be trained using a plurality of learning data by a learning algorithm, so that a predefined operation rule or AI model set to perform a desired feature (or a purpose) is generated. Such learning may be accomplished in a device itself in which artificial intelligence according to the disclosure is performed, and may be implemented through a separate server and/or system. Examples of learning algorithms include, but are not limited to, supervised learning, unsupervised learning, semi-supervised learning, reinforcement learning, or the like.

The AI model may include a plurality of neural network layers. Each of the plurality of neural network layers may have a plurality of weight values, and may perform a neural network algorithm through algorithm between an algorithm result of a previous layer and a plurality of weights. A plurality of weights having a plurality of neural network layers may be optimized and/or improved by a learning result of the AI model. For example, a plurality of weights may be updated such that a loss value or cost value obtained in the AI model during the learning process is reduced or minimized. The artificial neural network may include, for example, and without limitation, a deep neural network (DNN), a convolutional neural network (CNN), a recurrent neural network (RNN), a Restricted Boltzmann Machine (RNN), a Deep Belief Network (DBN), a Bidirectional Recurrent Deep Neural Network (BRDNN), deep Q-Networks, or the like.

For example, the electronic apparatus 100 may train the artificial intelligence model (main artificial intelligence model) for the power control priority to identify the power control priority of each terminal device included in one group by using the power standardization distribution data generated for each type of the terminal device and the standard score of the power usage amount of each terminal device as input data. The electronic apparatus 100 may classify the terminal device according to types based on the received information and power usage amount of the individual terminal device, and calculate the power standardization distribution data and the standard score of each terminal device for each classified type of the terminal devices. The electronic apparatus 100 may identify the power control priority of each terminal device by using the artificial intelligence model trained for the power control priority based on the power standardization distribution data generated for each type of the terminal device and the standard score of the power usage amount of each terminal device.

The electronic apparatus 100 may train an artificial intelligence model (first artificial intelligence model) for device classification to classify the terminal device into a preset type by using information of a plurality of terminal devices as input data. The electronic apparatus 100 may classify each terminal device according to types by using an artificial intelligence model trained for device classification based on the received information of the individual terminal device.

The electronic apparatus 100 may generate power standardization distribution data for each classified type, and train an artificial intelligence model (a second artificial intelligence model) for power standardization and standard score calculation to identify a standard score of power usage of each terminal device. The electronic apparatus 100 may calculate the power standardization distribution data according to the type of the terminal device and the standard score of each terminal device by using the artificial intelligence model trained for power standardization and standard score calculation based on the information on the classified type to which the terminal device belongs and the received power usage of each terminal device.

For example, the electronic apparatus 100 may train the artificial intelligence model with respect to the entire process described above, and may perform the entire process of identifying the power control priority by using the trained artificial intelligence model. Alternatively, the electronic apparatus 100 may train the artificial intelligence model for some of the processes described above and identify the power control priority by using the trained artificial intelligence model.

According to an embodiment, the electronic apparatus 100 may include only the trained main artificial intelligence model. In this example, the electronic apparatus 100 may use an algorithm set in a predetermined method for classifying the terminal devices, generating the power standardization distribution data, and identifying the standard score identification, and may use the trained main artificial intelligence model only for identifying the power control priority. Alternatively, the electronic apparatus 100 may include the trained main artificial intelligence model and the trained first artificial intelligence model. In this example, the electronic apparatus 100 may classify the terminal device by using the trained first artificial intelligence model. The electronic apparatus 100 may generate the power standardization distribution data and identify the standard score using an algorithm set in a predetermined manner, and identify the power control priority by using the main artificial intelligence model based on the generated power standardization distribution data and the identified standard score. Alternatively, the electronic apparatus 100 may include a trained main artificial intelligence model and a trained second artificial intelligence model. In this example, the electronic apparatus 100 may classify the terminal device into a preset type using an algorithm set in a predetermined manner. The electronic apparatus 100 may generate the power standardization distribution data, identify the standard score, and identify the power control priority by using the second artificial intelligence model and the main artificial intelligence model. Alternatively, the electronic apparatus 100 may include the trained main artificial intelligence model, the trained first and second artificial intelligence models. In this example, the electronic apparatus 100 may perform the above-described entire process using an artificial intelligence model trained based on the received information and power usage of the terminal device, and may identify the power control priority of each terminal device.

For example, the electronic apparatus 100 may control power usage of a plurality of terminal devices included in the first group. In this example, the electronic apparatus 100 may identify the priority based on the power standardization distribution data corresponding to each device and the power usage amount of each device, and control the power usage of the plurality of terminal devices included in the first group according to the identified priority. As described above, the first group includes the dryer 200a, the washing machine 200b, the air dresser 200c, the TV 200d, and the refrigerator 200e. The electronic apparatus 100 may generate power standardization distribution data corresponding to each terminal device and receive power usage of each terminal device included in the first group. The electronic apparatus 100 may identify the power standard score of the dryer 200a based on the power standardization distribution data corresponding to the dryer and the power usage amount of the dryer 200a included in the first group. The electronic apparatus 100 may identify the power standard score of each terminal device in the manner described above with respect to the washing machine 200b, the air dresser 200c, the TV 200d, and the refrigerator 200e included in the first group. In an embodiment, if the power standard score is 0.3 for the dryer 200a, 0.5 for the washing machine 200b, 0.6 for the air dresser 200c, 0.7 for the TV 200d, and 0.9 for the refrigerator 200e, the electronic apparatus 100 may set the power control priority order in the order of the refrigerator 200e, the TV 200d, the air dresser 200c, the washing machine 200b, and the dryer 200a. Alternatively, since the average of the power standard scores is 0.5, the electronic apparatus 100 may exclude the dryer 200a having a power standard score of less than 0.5 from the power control targets. The electronic apparatus 100 may train the artificial intelligence model that identifies the power control priority for performing the above-described process. The electronic apparatus 100 may obtain the result of the power control priority of each terminal device by using the trained artificial intelligence model.

The electronic apparatus 100 may identify the terminal device based on the identified priority and transmit a control signal for power usage to the identified terminal device. For example, the electronic apparatus 100 may transmit a power control signal to the refrigerator 200e having the highest power control priority, and may transmit a power control signal to the TV 200d having the second priority if power control is additionally required. Whenever additional power control is required, the electronic apparatus 100 may transmit the power control signal in the order of the air dresser 200c, the washing machine 200b, and the dryer 200a according to the priority. Alternatively, each group may include a hub device. When each group includes a hub device, the electronic apparatus 100 may transmit power control priority information and power control information to the hub device. For example, when the refrigerator 200e in the first group is a hub device, the electronic apparatus 100 may transmit power control priority information set in the order of the refrigerator 200e, the TV 200d, the air dresser 200c, the washing machine 200b, and the dryer 200a, and power control information for each terminal device. The refrigerator 200e, which is a hub device, may receive power control priority information and power control information for each terminal device from the electronic apparatus 100, and control power usage of each terminal device in the group according to the received information. The above-described method of setting the power standardized data and the power control priority, and the detailed example of the power control information will be described later.

Figure 3:
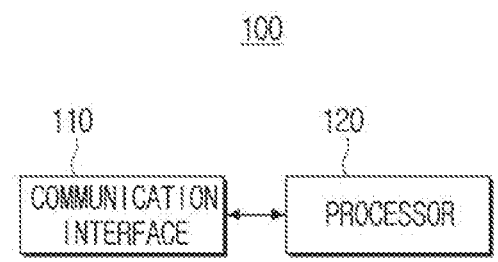
FIG. 3 is a block diagram illustrating a configuration of an electronic apparatus, according to an embodiment of the disclosure.

FIG. 3 is a block diagram illustrating a configuration of an electronic apparatus according to an embodiment of the disclosure.

Referring to FIG. 3, the electronic apparatus 100 may include a communication interface 110 and a processor 120.

The communication interface 110 may communicate with an external device. For example, the communication interface 110 may communicate with an external device by at least one of a communication method of Wi-Fi, Wi-Fi Direct, Bluetooth, Zigbee, 3rd Generation (3G), 3rd Generation Partnership Project (3 GPP), and Long Term Evolution (LTE) communication. The communication interface 110 may receive information and power usage of the terminal device from the terminal device. For example, the communication interface 110 may receive information and power usage of the terminal device from each of the individual terminal devices. Alternatively, the communication interface 110 may receive information about a terminal device included in a corresponding group and a power usage amount from the hub device of each group. The above-described communication interface 110 may be referred to as a communication device, a communication unit, a communication module, a transceiver, or the like.

The processor 120 may control each configuration of the electronic apparatus 100. The processor 120 may classify the plurality of terminal devices into a plurality of types based on preset criteria. For example, the processor 120 may classify a plurality of terminal devices with reference to a function based on information of the terminal device. Alternatively, the processor 120 may classify a plurality of terminal devices as a comprehensive product group.

The processor 120 may generate power standardization distribution data for each type of the classified terminal device based on the received power usage. The processor 120 may generate power standardization distribution data on a month, a quarter, a half-year, or a year. For example, the power standardization distribution data may be generated in the form of a normal distribution function. The processor 120 may identify a power standard score of each of the plurality of devices based on the power usage of each of the plurality of devices included in the preset group and the power standardization distribution data corresponding to each of the plurality of devices. The processor 120 may identify the power standard score based on the average power usage for each type of the classified terminal device, the variance, and the power usage amount of the terminal device included in the preset group. For example, when the type of the terminal device is classified into a washing machine, an air conditioner, and a refrigerator, or the like, the processor 120 may generate power standardization distribution data for each of the washing machine, the air conditioner, and the refrigerator. The processor 120 may identify a power standard score of each of the first washing machine, the first air conditioner, and the first refrigerator based on a power usage amount of each of the first washing machine, the first air conditioner, and the first refrigerator. The first washing machine, the first air conditioner, and the first refrigerator, which are included in the same group, refer to a terminal device that is a power control target.

The processor 120 may identify a priority of power control of each of a plurality of devices included in a preset group based on the identified power standard score. For example, if the power standard score of the first washing machine is 0.3, the power standard score of the first air conditioner is 0.6, and the power standard score of the first refrigerator is 0.7, the processor 120 may identify the priority of the power control in the order of the first refrigerator, the first air conditioner, and the first washing machine. Alternatively, the processor 120 may identify the terminal device for controlling the power usage based on the power standard score. For example, the processor 120 may identify a device in which the identified power standard score among the plurality of devices exceeds the average of the power standardization distribution data as a device for controlling power usage. In this example, the processor 120 may identify the first refrigerator and the first air conditioner as an apparatus for controlling power usage. Alternatively, the processor 120 may exclude a device in which the identified power standard score among the plurality of devices included in the preset group is less than the average of the power standardization distribution data from the device for controlling power usage. In this example, the processor 120 may exclude the first washing machine from the device for controlling power usage.

The processor 120 may identify at least one of a plurality of devices included in a preset group based on the identified priority, and transmit a control signal for use of power to the identified device through the communication interface. For example, when the electronic apparatus 100 receives power usage from an individual terminal device, the processor 120 may transmit a power control signal to the first refrigerator having the highest priority among the individual terminal devices through the communication interface 110. When additional power control is required, the processor 120 may transmit a power control signal to the first air conditioner, which is the next priority, through the communication interface 110. Alternatively, when the electronic apparatus 100 receives the power usage from the hub device in the preset group, the processor 120 may transmit the power control signal to the hub device through the communication interface 110. The processor 120 may identify the hub device among the plurality of devices included in the preset group and transmit the power control signal to the hub device through the communication interface 110. For example, the power control signal may include an identified power saving ratio based on a preset power saving level. When the power control signal is transmitted to the hub device, the power control signal may include information such as the identified priority information, the identified power saving ratio, or the like.

The processor 120 may receive operation setting information together with power usage through the communication interface 110 from each of the terminal devices. The processor 120 may identify average operation setting information based on the received operation setting information. The processor 120 may transmit a control signal for operating the power control target terminal device through the communication interface 110 according to the identified average operation setting information. For example, if the terminal device is an air conditioner, the operation setting information may include an open air temperature, a set temperature, an air volume, an operation mode, an operation time, and the like. The processor 120 may identify an average set temperature, difference between an open air temperature and a set temperature, an air volume, an operation mode, an operation time, and the like based on the received operation setting information of each air conditioner. Alternatively, the processor 120 may identify the average operation setting information based on the operation setting information of the air conditioner using the average power.

As described above, the electronic apparatus 100 may identify the power control priority of each terminal device through the artificial intelligence model that identifies the power control priority as described above. For example, although not illustrated in FIG. 3, the electronic apparatus 100 may further include a memory. The trained artificial intelligence model may be stored in a memory. When the processor 120 receives data from the terminal device, the processor 120 may load the artificial intelligence model stored in the memory to the processor 120. The processor 120 may perform a process of identifying the power control priority by using the loaded artificial intelligence model.

An artificial intelligence model (main artificial intelligence model) for power control priority may learn a power saving ratio or operation setting information of a terminal device to control power in a learning process. For example, the main artificial intelligence model may learn a power saving rate or a set average operation setting state by using a power saving ratio or set operation setting information corresponding to the calculated standard score of each terminal device as input data. In this example, the trained main artificial intelligence model may identify specific information for controlling the power of each terminal device together with the power control priority of each terminal device. The trained main artificial intelligence model may output power saving ratio or average operation setting information of the terminal device to control power together with the power control priority of each terminal device. Alternatively, the artificial intelligence model for outputting the power saving ratio or the average operation setting information of the terminal device to control power may be implemented as a main artificial intelligence model and a separate artificial intelligence model (third artificial intelligence model). The main artificial intelligence model may learn the process of identifying the power control priority of each terminal device to identify the power control priority of each terminal device, and the third artificial intelligence model may learn the power saving rate of each terminal device or the set average operation setting state to identify specific information to control the power of the terminal device.

Figure 4:
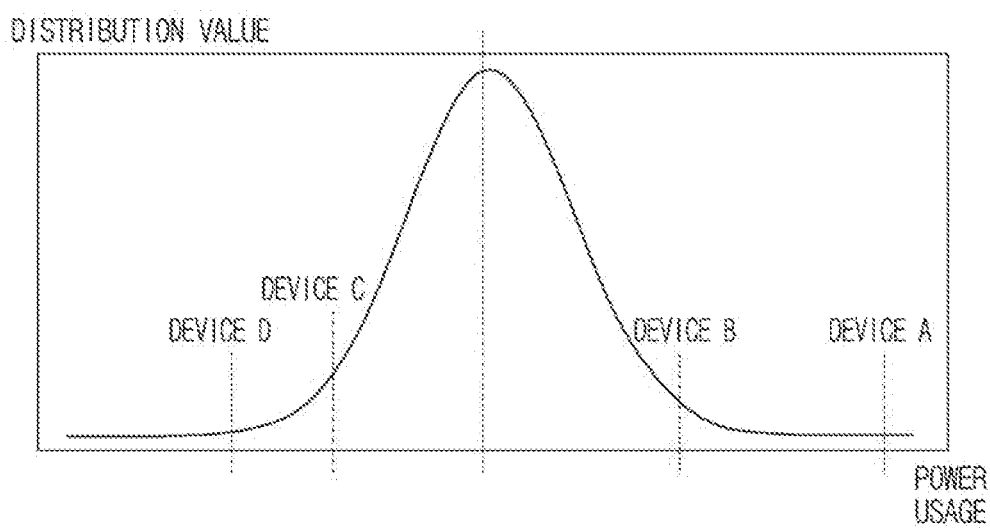
FIG. 4 is a diagram illustrating power usage distribution data of a terminal device, according to an embodiment of the disclosure.

FIG. 4 is a diagram illustrating power usage distribution data of a terminal device according to an embodiment of the disclosure.

The electronic apparatus may receive the information of the terminal device and the power usage amount of each terminal device from the terminal device included in each group. The electronic apparatus may classify the type of the terminal device and generate power standardization distribution data for each type based on the power usage amount of the terminal device included in each type. For example, as shown in FIG. 4, the power standardization distribution data may be generated in the form of a normal distribution function. The average of the power standardization distribution data may be 0.5.

The electronic apparatus may identify the power standard score comprises identifying the power standard score based on an average power usage for each type of the classified terminal device, a variance, and a power usage of the device included in the preset group. For example, if the classified type of terminal device is an air conditioner, the device A to device D illustrated in FIG. 4 may be an air conditioner included in each group. In an embodiment, the device A may be an air conditioner included in the first group, the device B may be an air conditioner included in the second group, the device C may be an air conditioner included in the third group, and the device D may be an air conditioner included in the fourth group. Alternatively, all of the devices A to D may be the air conditioner included in the first group. In addition, if the power standard score of each device is 0.9, device B is 0.7, device C is 0.35, and device D is 0.3, the relative position of power usage of each device may be displayed as shown in FIG. 4.

The electronic apparatus may identify that the device A has a relatively large amount of power usage and the device D has a relatively small amount of power usage based on the total power usage of the air conditioner. The device A may be a device having a high power control efficiency compared to an average power usage amount. Alternatively, the device A may be inferred to excessive use or unnecessarily use power when compared to a general use aspect. Accordingly, when controlling power usage, the electronic apparatus may identify the device A as the terminal device for controlling the power. As described above, the electronic apparatus may identify the priority order of the device B, the device C, and the device D sequentially.

Figure 5A:
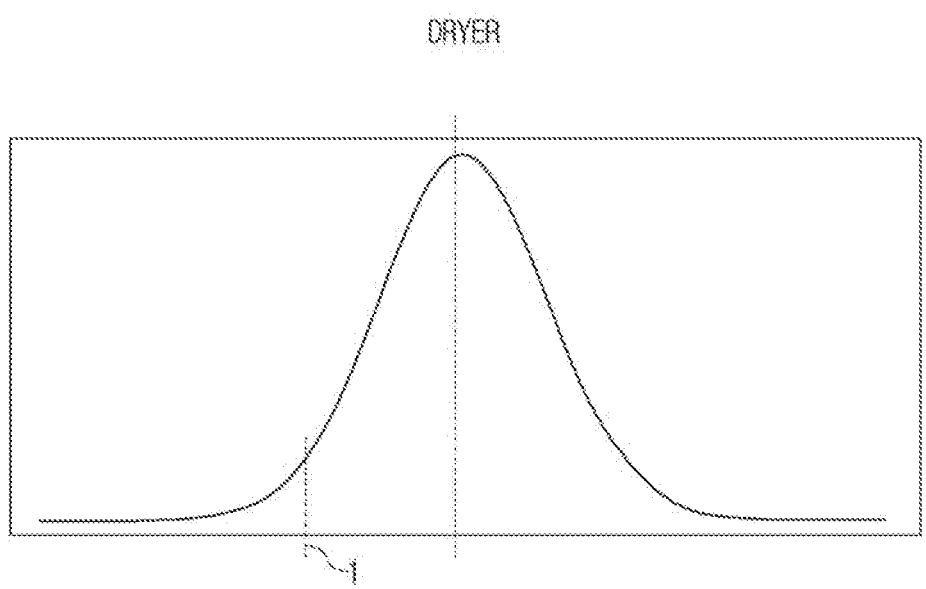
FIGS. 5A to 5C are diagrams illustrating the total power consumption distribution data according to the type of the terminal device and the power usage of the control target terminal device according to the type of the terminal device, according to an embodiment of the disclosure.
Figure 5B:
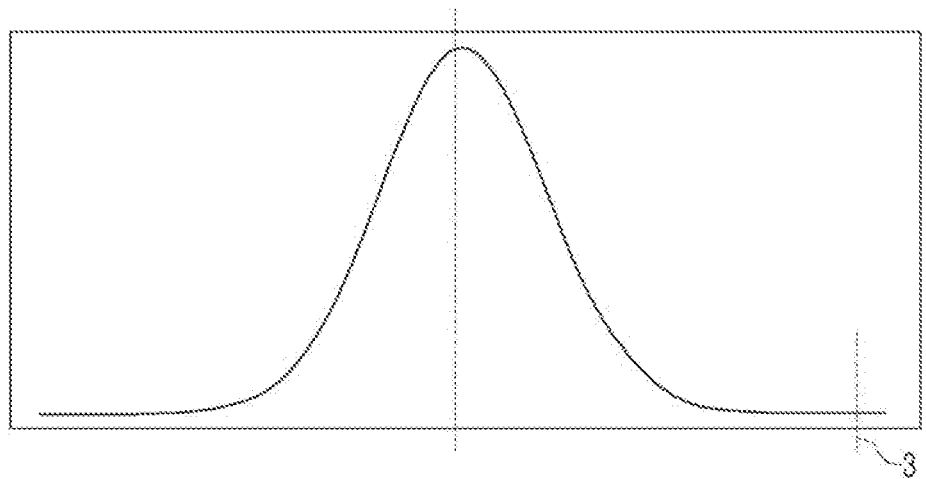
Figure 5C:
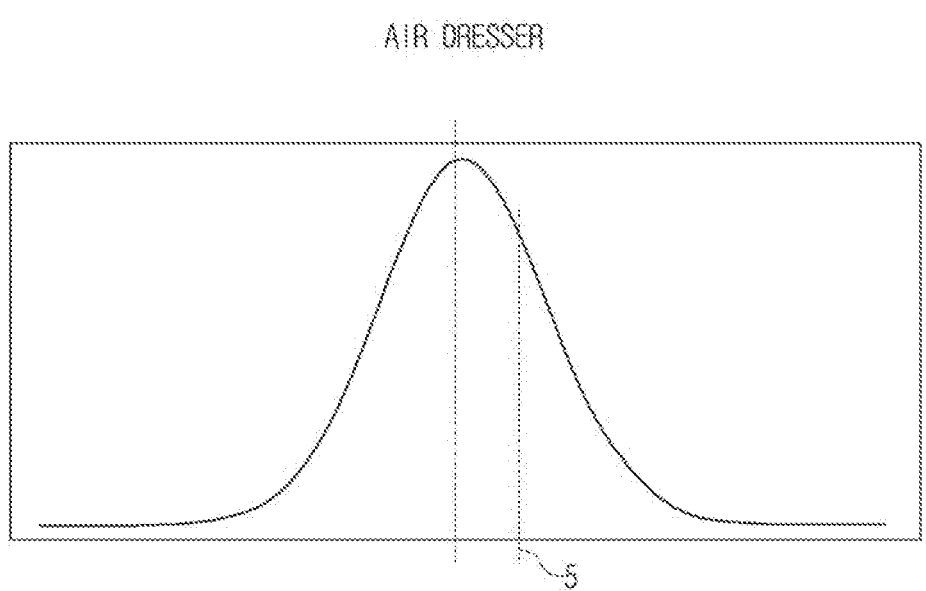

FIGS. 5A to 5C are diagrams illustrating the total power usage distribution data according to the type of the terminal device and the power usage amount of the control target terminal device according to the type of the terminal device according to an embodiment of the disclosure. For example, FIG. 5A illustrates power standardization distribution data of a dryer, FIG. 5B illustrates power standardization distribution data of a washing machine, and FIG. 5C may be power standardization distribution data of an air dresser. When the dryer 1, the washing machine 3, and the air dresser 5 are included in the same group (or one home), the electronic apparatus may calculate a power standard score of each of the dryer 1, the washing machine 3, and the air dresser 5 based on the power standardization distribution data of the terminal device for each type.

As an embodiment, as illustrated in FIGS. 5A to 5C, the average of the power standardization distribution data may be 0.5, the power standard score of the dryer 1 included in the same group may be 0.3, the power standard score of the washing machine 3 may be 0.9, and the power standard score of the air dresser 5 may be 0.6. The electronic apparatus may identify the priority of the power control target terminal device in the order of the washing machine 3, the air dresser 5, and the dryer 1 based on the power standardization distribution data for each type of each terminal device and the power standard score.

When the electronic apparatus transmits the power control signal to the individual terminal device, the electronic apparatus may first transmit a control signal including the identified power saving ratio based on the preset power saving level to the washing machine 3. The electronic apparatus may transmit a control signal including a power saving ratio to the air dresser 5 and finally transmit a control signal including a power saving ratio to the dryer 1. When the electronic apparatus transmits a power control signal to the hub device, the electronic apparatus may transmit a control signal including priority information of power control and a power saving ratio of each terminal device to the hub device.

For the electronic apparatus may receive operation setting information from each terminal device and identify average operation setting information. When the electronic apparatus identifies the average operation setting information, the electronic apparatus may transmit the average operation setting information of each terminal device to each terminal device or hub device instead of the power saving ratio.

When the power usage is controlled in the manner described above, the electronic apparatus may control power usage in different ways even in the case of a user holding the same terminal device. For example, the electronic apparatus may control the use of power in the order of the air conditioner, the washing machine, and the refrigerator among the terminal devices of the first user (or the first group) based on the power standardization distribution data and the standard score, and may control power usage in the order of the washing machine, the refrigerator, and the air conditioner among the terminal devices of the second user (or the second group).

The electronic apparatus may generate power standardization distribution data based on a predetermined time. For example, when the electronic apparatus generates the power standardization distribution data for each month, the priority of the power control target terminal device may be changed for each month. Alternatively, when the electronic apparatus generates the power standardization distribution data in units of one year, the electronic apparatus may reflect a power control scheme according to a seasonal device or a special situation of the user. According to an embodiment, since the total power usage of the air conditioner may be rapidly increased, the electronic apparatus may increase power control efficiency by controlling power usage for the air conditioner of the summer based on the power standardization distribution data of one year and the total power usage. If the total average power usage of the summer air conditioner is 100 kW, the air conditioner power usage amount of the third user is 200 kW, and the air conditioner power usage amount of the fourth user is 50 kW, the electronic apparatus may increase power control efficiency by controlling power usage of the air conditioner of the third user. The electronic apparatus may estimate that the fourth user is at least or appropriately using the air conditioner based on the air conditioner power usage amount of the fourth user. The control of the power usage of the air conditioner of the fourth user may exclude the air conditioner of the fourth user from the power control target terminal device because the power usage of the air conditioner of the fourth user is inconvenienced to the fourth user or the power control efficiency is low.

When the fifth user temporarily uses the air conditioner in winter, the electronic apparatus may identify that the use of the air conditioner of the fifth user is a special situation based on the power standardization distribution data of one year and the total power usage, and may exclude the air conditioner from the power control target. The embodiment described in FIGS. 4 and 5 may be performed using the trained artificial intelligence model that identifies the power control priority. So far, an embodiment of controlling power usage based on the user's usage tendency and power control efficiency has been described. Hereinafter, a control method of an electronic apparatus will be described.

Figure 6:
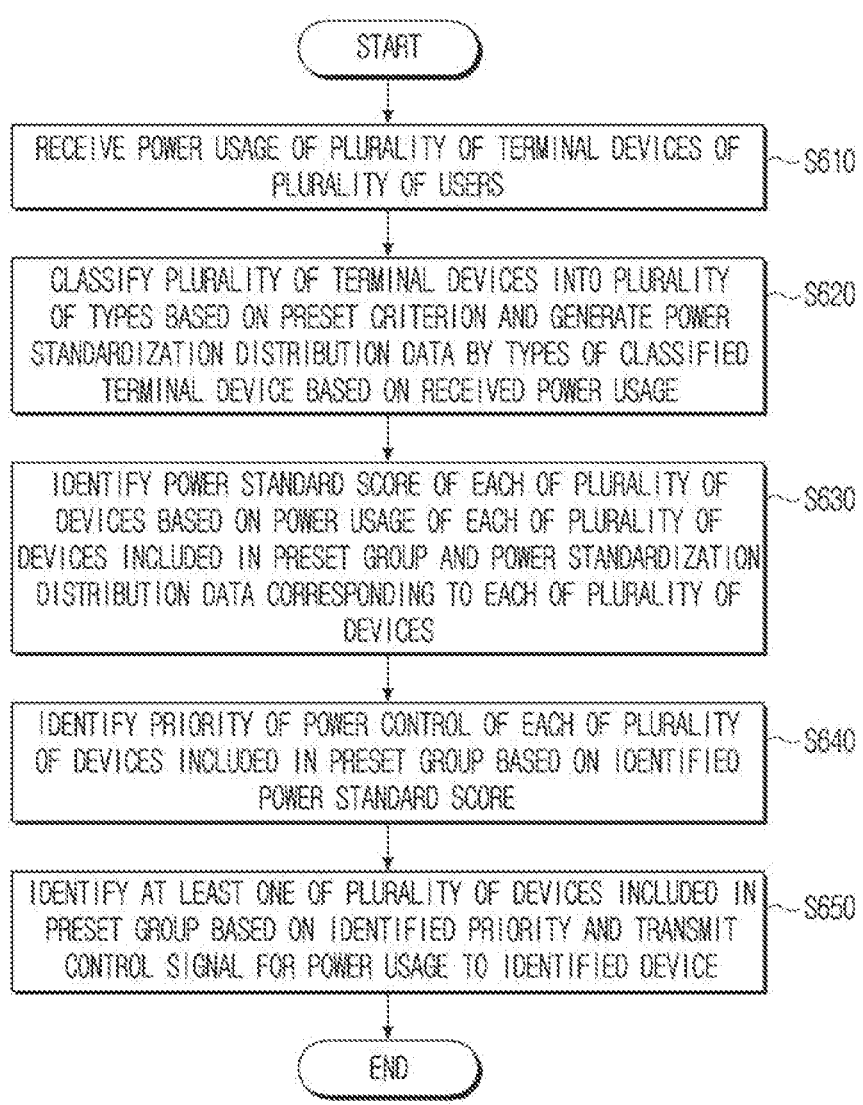
FIG. 6 is a flowchart illustrating a method of controlling an electronic apparatus, according to an embodiment of the disclosure.

FIG. 6 is a flowchart illustrating a method of controlling an electronic apparatus according to an embodiment of the disclosure.

Referring to FIG. 6, the electronic apparatus may receive power usage of a plurality of terminal devices of plurality of users in operation S610. The electronic apparatus may classify the plurality of terminal devices into a plurality of types based on a preset criterion. The electronic apparatus may generate power standardization distribution data by types of the classified terminal device based on the received power usage in operation S620. For example, the power standardization distribution data may be generated in a unit of a month, a quarter, a half-year, or a year.

In operation S630, the electronic apparatus may identify a power standard score of each of the plurality of devices based on the power usage of each of the plurality of devices included in the preset group and the power standardization distribution data corresponding to each of the plurality of devices. For example, the preset group may be set based on a location at which the terminal device is disposed, a user, or the like. According to an embodiment, a terminal device included in one home, one building, or the like may be set as one group. Alternatively, a terminal device owned or used by the first user may be set as one group. The electronic apparatus may identify the power standard score of each terminal device based on the average power usage for each type of the classified terminal device, the variance, and the power usage of the device included in the preset group.

The electronic apparatus may identify a priority of power control of each of the plurality of devices included in the preset group based on the identified power standard score in operation S640. Meanwhile, the electronic apparatus may identify, as a device for controlling power usage, a device in which the identified power standard score among the plurality of devices included in the preset group exceeds the average of the generated power standardization distribution data. Alternatively, the electronic apparatus may exclude a device in which the identified power standard score among the plurality of devices included in the preset group is less than the average of the generated power standardization distribution data from the device for controlling power usage.

The electronic apparatus may identify at least one of the plurality of devices included in the preset group based on the identified priority. The electronic apparatus may transmit a control signal for power usage to the identified device in operation S650. The electronic apparatus may transmit a control signal including the identified power saving ratio based on the identified power standard score and the preset power saving level. Alternatively, the electronic apparatus may receive operation setting information from the plurality of terminal devices of the plurality of users. The electronic apparatus may identify the average operation setting information based on the received operation setting information. In this case, the electronic apparatus may transmit a control signal for operating the terminal device according to the identified average operation setting information instead of the preset power saving ratio. Alternatively, when the hub device is included in the preset group, the electronic apparatus may identify the hub device among the plurality of devices included in the preset group and transmit the control signal to the hub device.

The control method of the electronic apparatus according to various embodiments described above may be provided as a computer program product. The computer program product may include an S/W program itself or a non-transitory computer readable medium in which an S/W program is stored.

The non-transitory computer-readable medium does not refer to a medium that stores data for a short period of time, such as a register, cache, memory, etc., but semi-permanently stores data and is available of reading by the device. Specifically, the above-described various applications or programs may be stored in a non-transitory computer readable medium such as a CD, a DVD, a hard disk, a Blu-ray disk, universal serial bus (USB), a memory card, ROM, or the like, and can be provided.

While embodiments of the disclosure have been shown and described, the disclosure is not limited to the aforementioned specific embodiments, and it is apparent that various modifications can be made by those having ordinary skill in the technical field to which the disclosure belongs, without departing from the gist of the disclosure as claimed by the appended claims. Also, it is intended that such modifications are not to be interpreted independently from the technical idea or prospect of the disclosure.

The invention claimed is:

1. A control method of an electronic apparatus, the control method comprising:

receiving power usage from a plurality of terminal devices;

classifying the plurality of terminal devices into a plurality of types based on a preset criterion, and generating power standardization distribution data for each type among the plurality of types of the classified terminal device based on the received power usage;

identifying a power standard score of each terminal device of the plurality of terminal devices based on the power usage of each terminal device of the plurality of terminal devices included in a preset group and the power standardization distribution data corresponding to each terminal device of the plurality of terminal devices;

identifying a priority of power control of each terminal device of the plurality of terminal devices included in the preset group based on the identified power standard score; and identifying at least one terminal device among the plurality of terminal devices included in the preset group based on the identified priority, and transmitting a control signal for power use to the identified terminal device.

2. The control method of claim 1, further comprising:
identifying a terminal device in which the identified power standard score among the plurality of terminal devices included in the preset group exceeds an average of the generated power standardization distribution data as a terminal device for control of the use of the power.

3. The control method of claim 1, further comprising:
excluding a terminal device in which the identified power standard score among the plurality of terminal devices included in the preset group is less than an average of the generated power standardization distribution data from the terminal device for control of the use of the power.

4. The control method of claim 1, wherein the transmitting the control signal comprises transmitting a control signal including a power saving ratio based on the identified power standard score and a preset power saving level.

5. The control method of claim 1, further comprising:
receiving operation setting information from the plurality of terminal devices; and
identifying average operation setting information based on the received operation setting information,
wherein the transmitting of the control signal comprises transmitting the control signal for operating the terminal device included in the preset group according to the identified average operation setting information.

6. The control method of claim 1, wherein the preset group is set based on at least one of a position where a terminal is disposed and a user.

7. The control method of claim 1, wherein the generating the power standardization distribution data comprises generating data in a unit of a month, a quarter, a half-year, or a year.

8. The control method of claim 1, wherein the identifying the power standard score comprises identifying the power standard score based on an average power usage for each type of the classified terminal device, a variance, and a power usage of the terminal device included in the preset group.

9. The control method of claim 1, wherein the transmitting the control signal comprises identifying a hub device among a plurality of terminal devices included in the preset group and transmitting the control signal to the hub device.

10. An electronic apparatus comprising:
a communication interface; and
a processor configured to:
receive power usage from a plurality of terminal devices,
classify the plurality of terminal devices into a plurality of types based on a preset criterion,
generate power standardization distribution data by types of the classified terminal device based on the received power usage,
identify a power standard score of each terminal device of the plurality of terminal devices based on the power usage of each terminal device of the plurality of terminal devices included in a preset group and the power standardization distribution data corresponding to each terminal device of the plurality of terminal devices,
identify a priority of power control of each terminal device of the plurality of terminal devices included in the preset group based on the identified power standard score,
identify at least one terminal device among a plurality of terminal devices included in the preset group based on the identified priority, and
transmit a control signal for power use to the identified terminal device.

11. The electronic apparatus of claim 10, wherein the processor is further configured to identify a terminal device in which the identified power standard score among the plurality of terminal devices included in the preset group exceeds an average of the generated power standardization distribution data as a terminal device for control of the use of the power.

12. The electronic apparatus of claim 10, wherein the processor is further configured to exclude a terminal device in which the identified power standard score among the plurality of terminal devices included in the preset group is less than an average of the generated power standardization distribution data from the terminal device for control of the use of the power.

13. The electronic apparatus of claim 10, wherein the processor is further configured to transmit a control signal including to power saving ratio based on the identified power standard score and a preset power saving level.

14. The electronic apparatus of claim 10, wherein the processor is further configured to:
receive operation setting information from the plurality of terminal devices, identify average operation setting information based on the received operation setting information, and transmit the control signal for operating the terminal device included in the preset group according to the identified average operation setting information.

15. The electronic apparatus of claim 10, wherein the preset group is set based on at least one of a position where a terminal is disposed and a user.

* * * * *